Storle & Swenson.
Horse Rake.
Patented Nov 24, 1868

N° 84315

WITNESS.
J. B. Smith
H. S. Look

INVENTORS.
Ole O Storle
Lorens Swenson

United States Patent Office.

OLE O. STORLE AND LORENS SWENSON, OF NORWAY, WISCONSIN.

*Letters Patent No. 84,315, dated November 24, 1868.*

IMPROVEMENT IN HORSE-RAKES.

The Schedule referred to in these Letters Patent and making part of the same.

*To all whom it may concern:*

Be it known that we, OLE O. STORLE and LORENS SWENSON, of Norway, in the county of Racine, and State of Wisconsin, have invented a new and useful Improvement in Hore-Rakes; and we do hereby declare that the following is a full, clear, and exact description thereof, which will enable those skilled in the art to make and use the same, reference being had to the accompanying drawing, forming part of this specification, in which—

Figure 1:
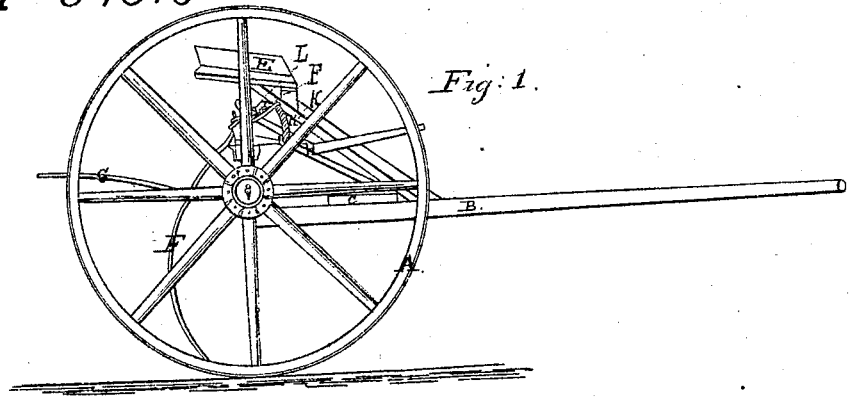
Figure 1 is a side view of our invention.
Figure 2:
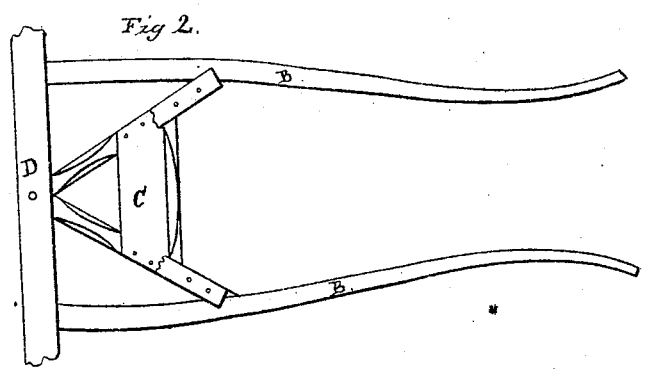
Figure 2 is a view of the thills and bracing.
Figures 3, 4, 5:
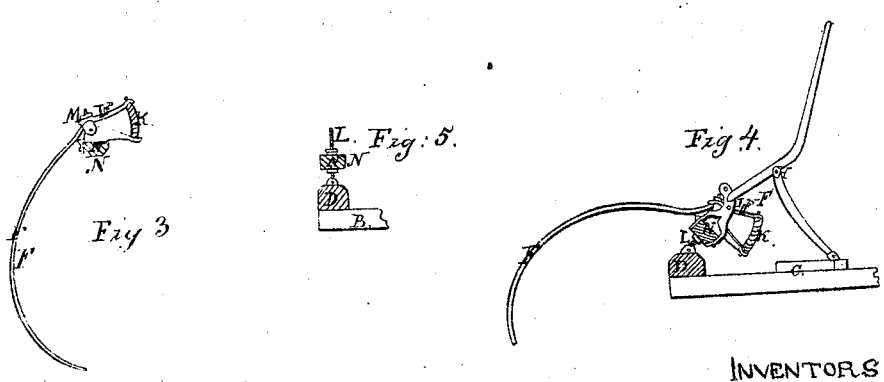

Figure 3, a view of one of the teeth and its fastenings;

Figure 4, a view of the lock with which the teeth are raised and lowered; and

Figure 5, a view of the bolt with which the distance is regulated for the teeth on soft or hard ground.

Similar letters of reference in each of the figures indicate corresponding parts.

The object of our invention is to produce a rake easily adjusted and easily worked.

A is the wheel.

B, the thills.

C, the bracing of the rake.

D, the axle.

E, the seat.

F, the teeth, passing through the head of bolt M, and its end crooked, and passing up through the top of hinge I, to prevent its turning.

G, the teeth-cleaners.

H, the lock, with a handle, with which the teeth are raised or lowered, and, when either raised or lowered, it pulls or pushes on a straight line.

I, the hinge which holds the tooth attached to the bolster N.

K, spring on a stem holding the hinge open.

L, adjustable bolt, with a joint at the axle, and a nut underneath the bolster, to which the teeth are attached, and a nut on top, with which the teeth are raised or lowered, as may be desired.

M, a bolt, with a hollow head, through which the teeth pass, and passing through the upper part of the hinge with a nut which draws the teeth firmly against the hinge and holds it fast.

N, bolster, to which the hinges are attached.

Operation.

Adjust the rake by the bolt L, according to the ground which you are to rake, and then throw the rake-teeth down by the handle of lock H, which will bring the lock in line so that the hay on the teeth will not open the lock when the teeth are filled with hay. Then lift up the lever, and the hay will be discharged. The locks stands in line the other way, so that the teeth will not go down again without being thrown down with the lever.

What we claim as our invention, and desire to secure by Letters Patent, is—

1. Hinged, cap I and bolt M, in combination with spring K, substantially as described.

2. Tooth F, passing through bolt M, with its end passing up through hinge I, substantially as and for the purpose specified.

OLE O. STORLE.
LORENS SWENSON.

Witnesses:
J. B. SMITH,
H. S. LOOK.